(12) United States Patent
Elnar

(10) Patent No.: US 7,802,614 B2
(45) Date of Patent: Sep. 28, 2010

(54) ELECTRIC MOTOR COOLING RINGS

(76) Inventor: Joseph G. Elnar, 3410 La Sierra Ave. #F435, Riverside, CA (US) 92503

( * ) Notice: Subject to any disclaimer, the term of this patent is extended or adjusted under 35 U.S.C. 154(b) by 218 days.

(21) Appl. No.: 12/141,721

(22) Filed: Jun. 18, 2008

(65) Prior Publication Data

US 2009/0315415 A1    Dec. 24, 2009

(51) Int. Cl.
*F28F 3/12*    (2006.01)
*F28F 7/00*    (2006.01)
*H02K 9/19*    (2006.01)

(52) U.S. Cl. .............. 165/46; 165/47; 165/86; 310/54; 417/423.8

(58) Field of Classification Search ............ 310/54; 417/423.8
See application file for complete search history.

(56) References Cited

U.S. PATENT DOCUMENTS

| | | | | |
|---|---|---|---|---|
| 3,127,530 A | * | 3/1964 | White | 310/54 |
| 4,497,365 A | * | 2/1985 | Boyer | 165/164 |
| 4,516,044 A | | 5/1985 | Bone | |
| 4,729,425 A | * | 3/1988 | Mitchell | 165/47 |
| 4,854,373 A | | 8/1989 | Williams | |
| 5,038,853 A | | 8/1991 | Callaway, Sr. et al. | |
| 5,172,754 A | * | 12/1992 | Graber et al. | 165/47 |
| 5,509,463 A | | 4/1996 | Callaway, Sr. et al. | |
| 5,647,736 A | | 7/1997 | French | |
| 5,742,954 A | | 4/1998 | Idland | |
| 5,906,236 A | | 5/1999 | Adams et al. | |
| 5,924,850 A | | 7/1999 | French | |
| 5,930,852 A | * | 8/1999 | Gravatt et al. | 4/541.1 |
| 6,200,108 B1 | * | 3/2001 | Caudill et al. | 417/366 |
| 6,428,283 B1 | | 8/2002 | Bonior | |
| 7,081,728 B2 | * | 7/2006 | Kemp | 318/437 |
| 7,322,103 B2 | | 1/2008 | Burjes et al. | |

* cited by examiner

*Primary Examiner*—Burton Mullins
(74) *Attorney, Agent, or Firm*—Kenneth L. Green

(57) ABSTRACT

An electric spa motor includes a ring circling the motor and in direct contact with the motor case. The ring carries a flow of water to cool the motor and to provide heat to the flow of water to supplement a spa heater. The ring includes a passage through the ring for carrying the flow of water. The ring and the passage have cross-sections with approximately equal height and width.

10 Claims, 7 Drawing Sheets

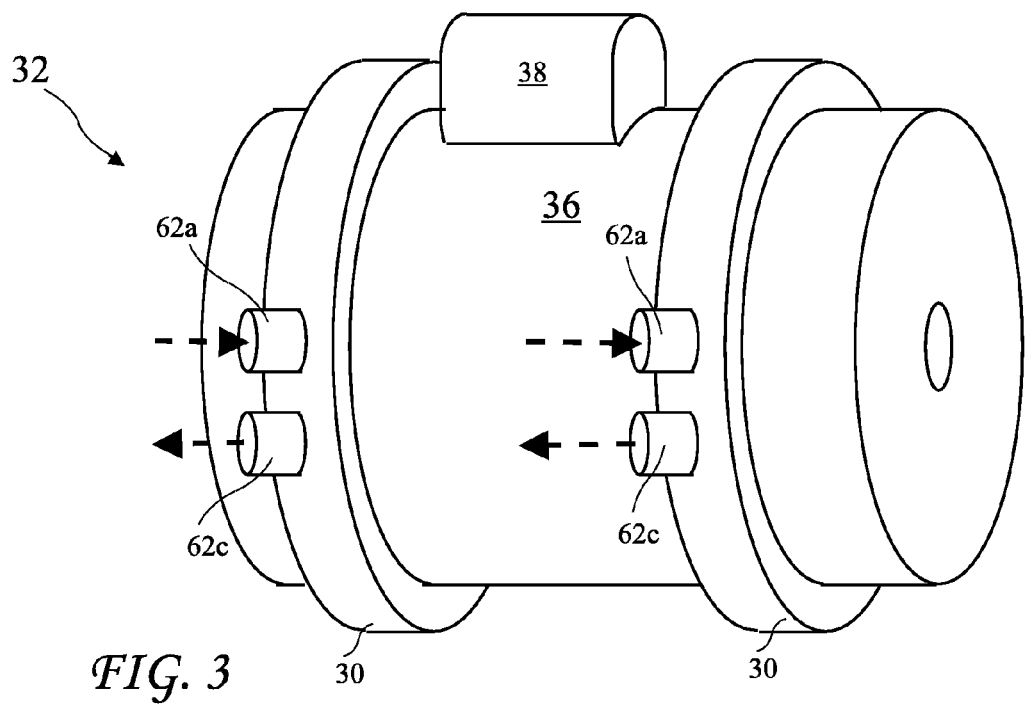
FIG. 3
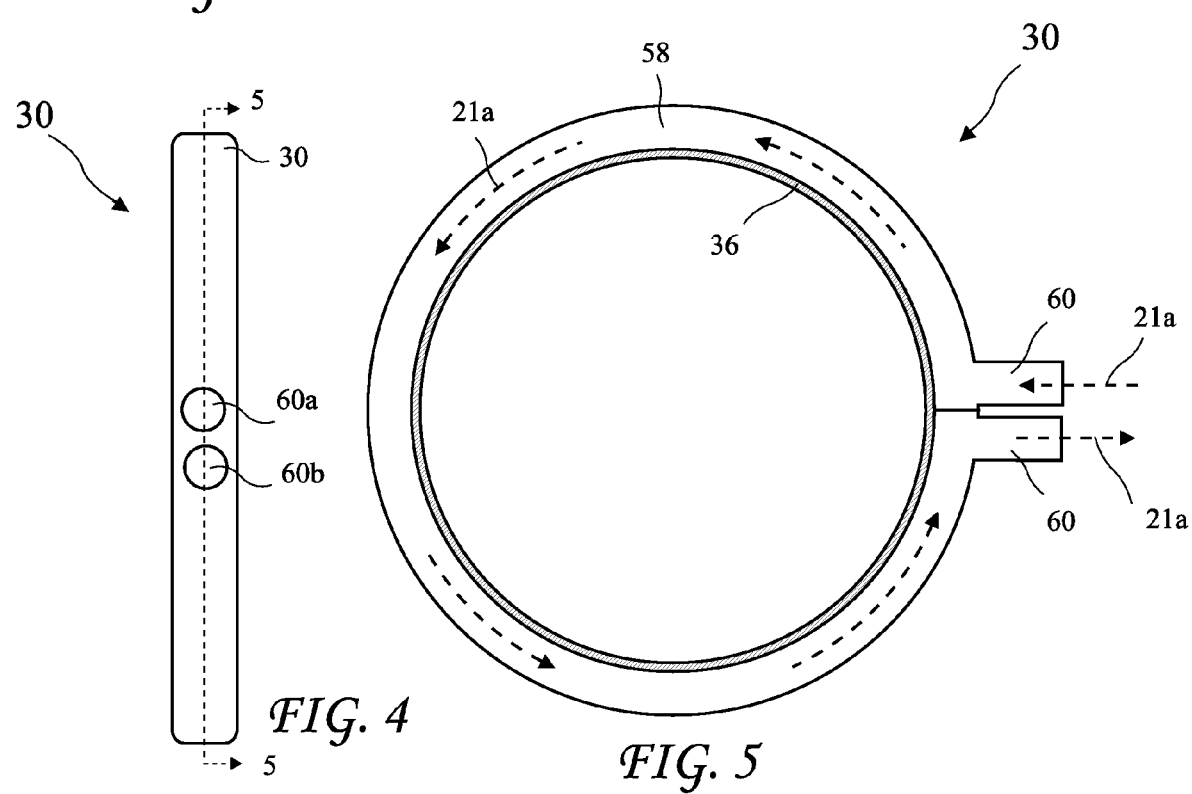
FIG. 4
FIG. 5

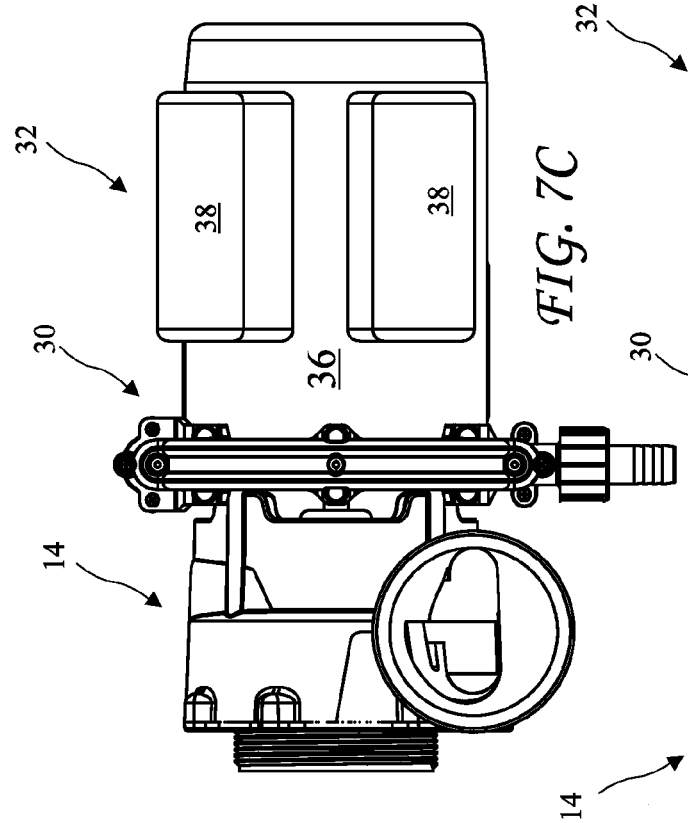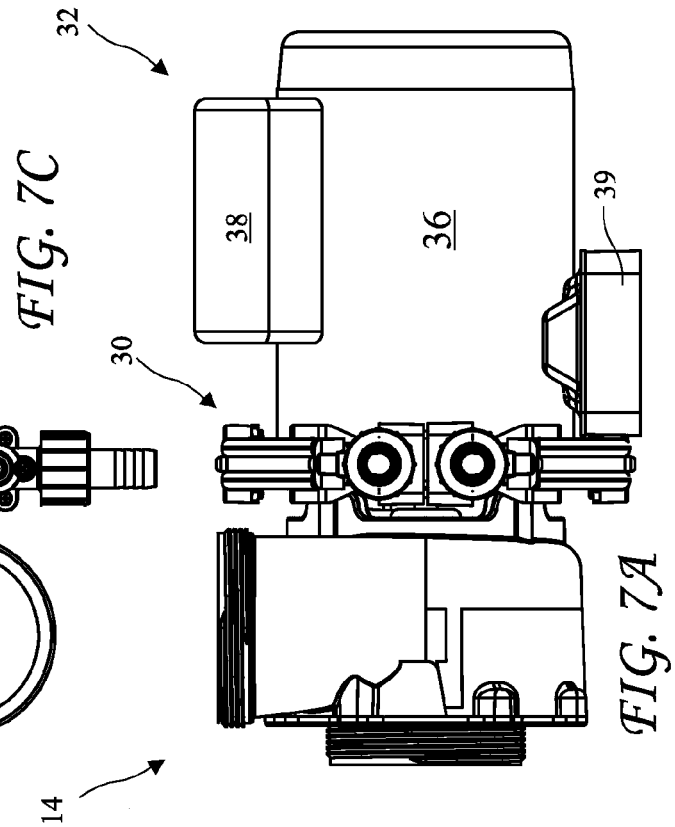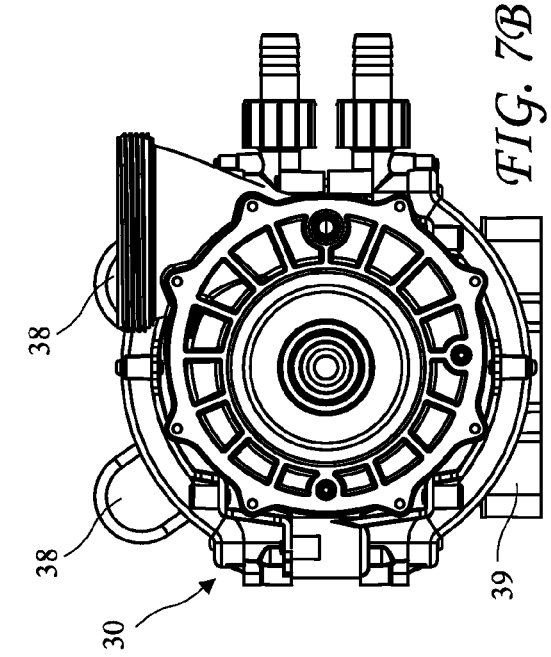

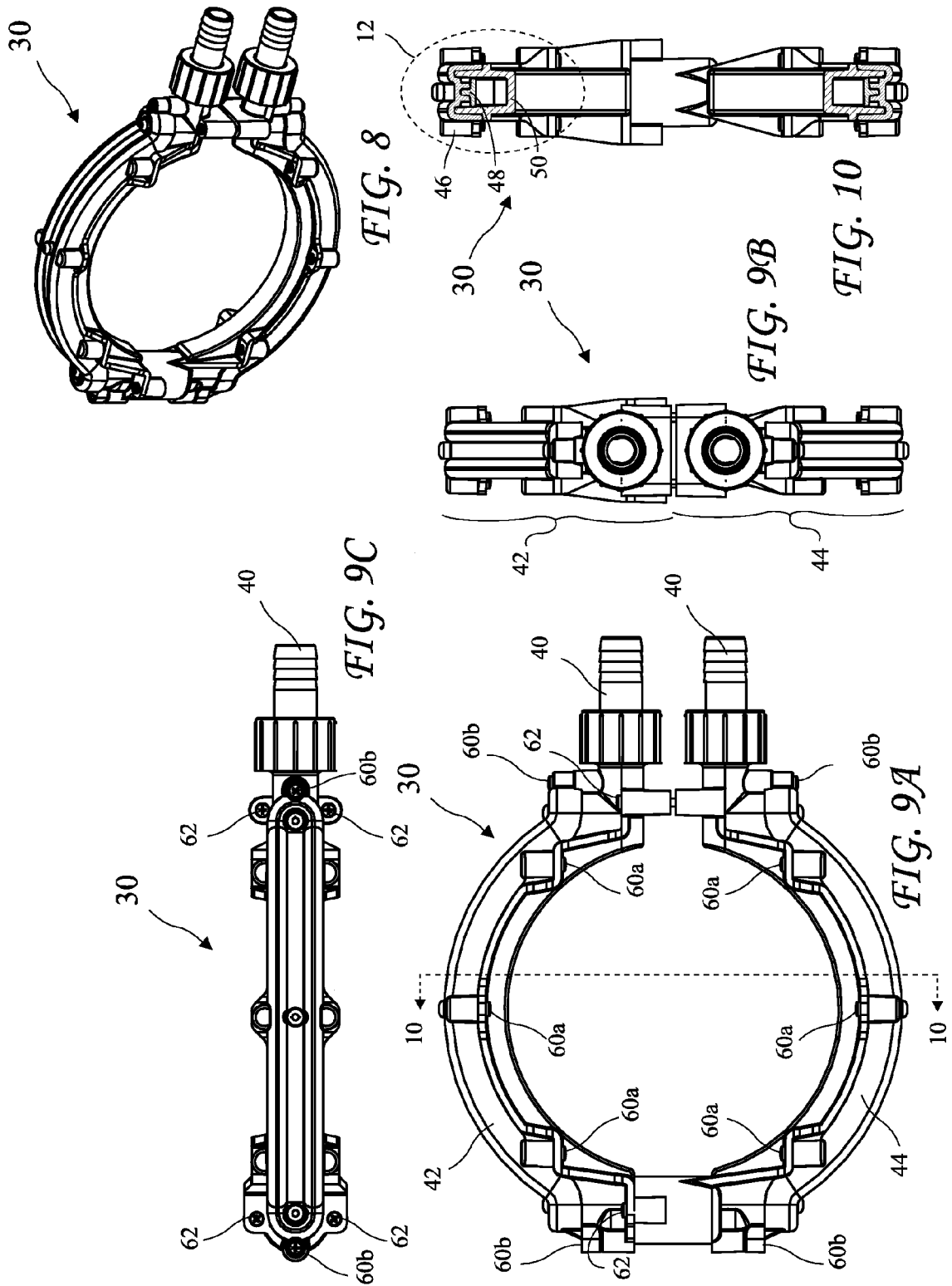

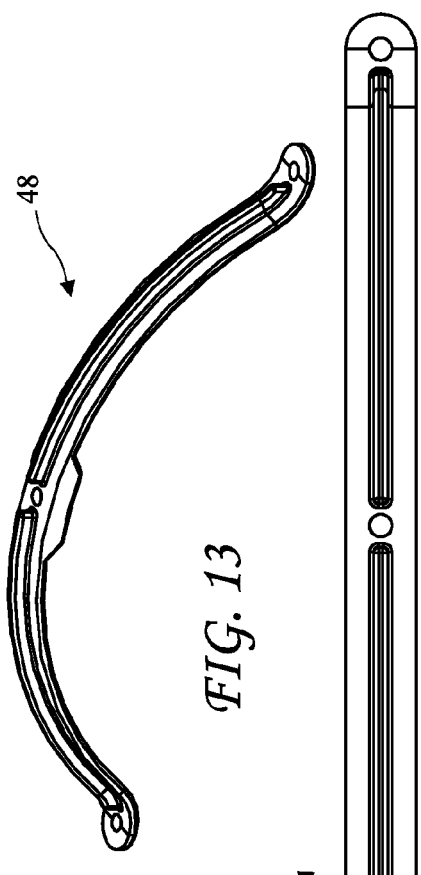
FIG. 13
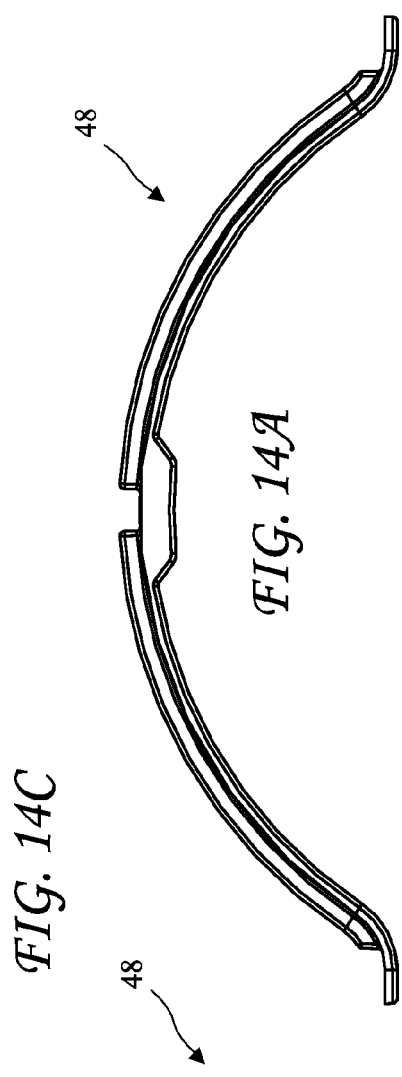
FIG. 14A
FIG. 14C
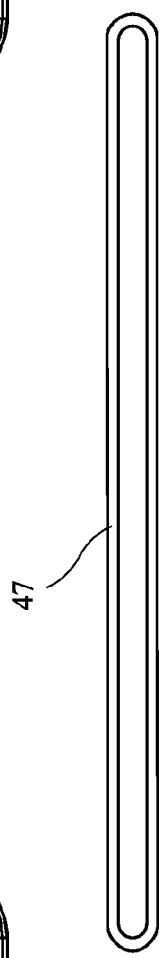
FIG. 15
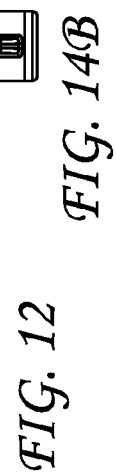
FIG. 14B
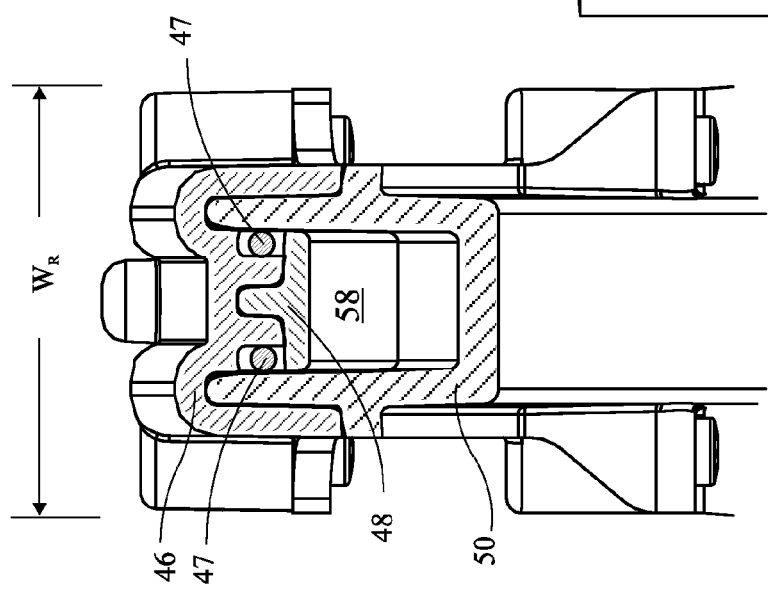
FIG. 12

ELECTRIC MOTOR COOLING RINGS

BACKGROUND OF THE INVENTION

The present invention relates to motor cooling and in particular to cooling rings rising on an electric spa pump motor case providing cooling for the motor and heat to a spa.

Many people enjoy using portable spas to relax. The combination of water jets provide a massage to tired muscles and heat to sooth the muscles. Unfortunately, such spas often rely on an electric heater to heat the water, and heating costs may be very high. Further, an electric motor is used to circulate water in the spa, and the motors often become very hot, shortening motor life, and sometimes limiting the length of spa use.

U.S. Pat. No. 4,854,373 for "Heat Exchanger for a Pump Motor," discloses a "C" shaped outer jacket residing over a spa pump motor housing for cooling the motor and adding heat to water circulated by the motor. The jacket of the '373 patent has a "C" shaped cross-section and rests over nearly the entire length of the motor housing to obtain heat transfer.

Other patents including U.S. Pat. No. 5,038,853 for "Heat Exchanger Assembly," U.S. Pat. No. 5,509,463 for "Saddle Type Heat Exchanger," U.S. Pat. No. 5,906,236 for "Heat Exchanger Jacket for Attachment to an External Surface of a Pump Motor," U.S. Pat. No. 7,322,103 for "Method of Making a Motor/Generator Cooling Jacket," and U.S. Pat. No. 4,516,044 for "Heat Exchanger Apparatus for Electric Motor and Electric Motor Equipped Therewith," similarly describe jackets residing over most of the motor case. Unfortunately, electric motors commonly used on portable spa pumps include capacitor housings on the outside of the motor housing. Such capacitor housings prevent the known jackets from being used.

BRIEF SUMMARY OF THE INVENTION

The present invention addresses the above and other needs by providing an electric spa motor which includes a ring heat exchanger circling the motor and in direct contact with the motor case. The ring carries a flow of water to cool the motor and to provide heat to the flow of water to supplement a spa heater. The ring includes a passage through the ring for carrying the flow of water. The ring and the passage have cross-sections with approximately equal height and width.

In accordance with one aspect of the invention, there is provided a ring heat exchanger for an electric spa pump motor. Known heat exchangers used with electric motors comprise jackets extending most of the length of a motor housing of the electric motor. Unfortunately, such jackets are not suitable for use with common electric spa pump motors having capacitor housings on a large center portion of the electric motor housings. The long extent of the jackets was assumed necessary to achieve a useful result. The present invention is a significant departure from such assumptions and from the resulting heat exchangers and provides a ring heat exchanger fitting over a portion of the motor housing between the capacitor housings and ends of the motor housing and achieves an unexpected benefit to motor cooling and to heat transfer to water circulated in the spa.

In accordance with another aspect of the invention, there is provided a spa having an electric spa pump motor and a ring heat exchanger for cooling the electric spa pump motor. The spa includes a spa tub having a spa tub wall, water residing in the spa tub, at least one drain for receiving a flow of the water from the spa tub, and a spa pump driven by the electric spa pump motor. A first pipe carries the flow of water from the drain to the spa pump and a second pipe carries the flow of water from the spa pump to jets in the spa tub wall. The spa pump motor has a motor housing and the ring heat exchanger includes a top half assembled to a bottom half, each half being approximately half of a circle, which resides in contact with the motor housing at an end of the motor housing. One of the top half and the bottom half includes a passage for receiving a by-pass portion of the flow of water received from a first by-pass line connected to the high-pressure side of the spa pump to enter the ring heat exchanger and the other one of the top half and the bottom half includes a passage for allowing the by-pass portion flow of water to exit the ring heat exchanger through a second by-pass line carrying the by-pass portion of the flow of water from ring heat exchanger to the low-pressure side of the spa pump.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 3 shows a perspective view of a generic spa pump motor with two ring heat exchangers according to the present invention on the spa pump motor.

FIG. 4 is a side view of the ring heat exchanger according to the present invention.

FIG. 5 is a cross-sectional view taken along line 5-5 of FIG. 4 of the ring heat exchanger according to the present invention and the flow of water through the ring heat exchanger.

FIG. 7A is a detailed side view of the spa pump and motor with one ring heat exchanger according to the present invention on the spa pump motor.

FIG. 7B is a detailed front view of the spa pump and motor with one ring heat exchanger according to the present invention on the spa pump motor.

FIG. 7C is a detailed top view of the spa pump and motor with one ring heat exchanger according to the present invention on the spa pump motor.

FIG. 8 is a perspective view of the ring heat exchanger according to the present invention.

FIG. 9A is a side view of the ring heat exchanger according to the present invention.

FIG. 9B is a front view of the ring heat exchanger according to the present invention.

FIG. 9C is a top view of the ring heat exchanger according to the present invention.

FIG. 10 is a cross-sectional view of the ring heat exchanger according to the present invention taken along line 10-10 of FIG. 9A.

FIG. 12 is a detailed cross-sectional view of the top ring half of FIG. 10.

FIG. 13 is a perspective view of a O-Ring retainer according to the present invention.

FIG. 14A is a side view of the O-Ring retainer.

FIG. 14B is an end view of the O-Ring retainer.

FIG. 14C is a top view of the O-Ring retainer.

FIG. 15 is a top view of an O-Ring for sealing the ring heat exchanger according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
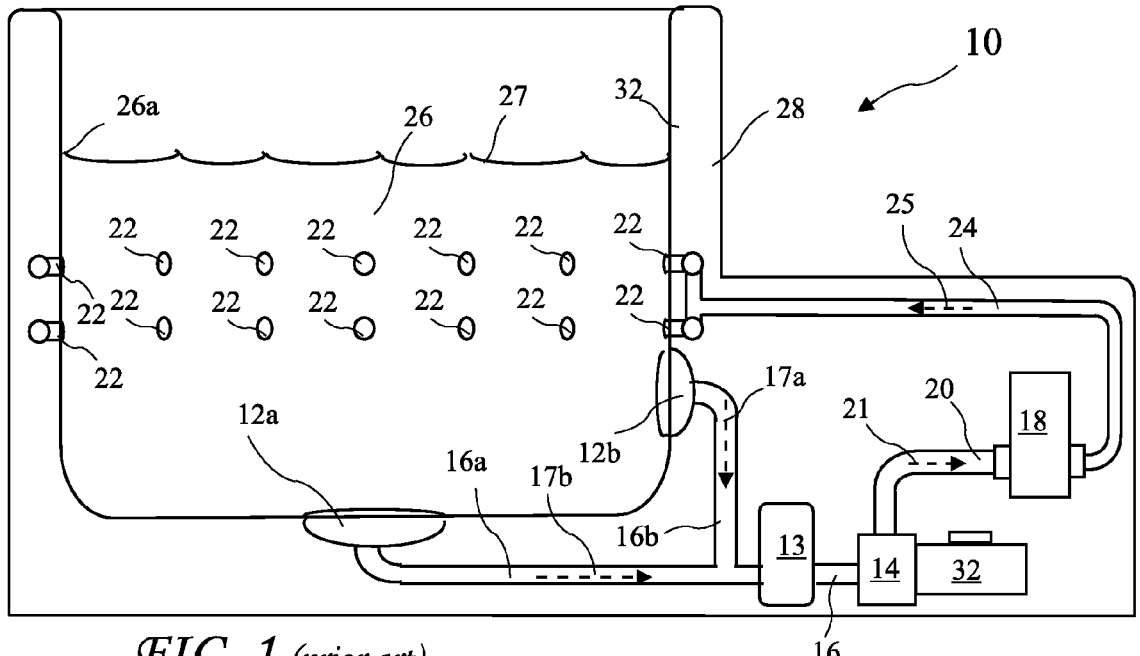
FIG. 1 is prior art spa.

A prior art spa 10 is shown in FIG. 1. The spa 10 includes drains 12a and 12b. The drains 12a, 12b are located below a spa water line 26a and are in fluid communication with a pump 14 and pump motor 32 through first pipes 16a and 16b carrying flows 17a and 17b of water 26 respectively, and combined through pipe 16, through a filter 13 and to the pump 14. A spa heater 18 is in fluid communication with the pump 14 through a second pipe 20 carrying second flow 21. The heater 18 is in fluid communication with jets 22 through pipe 24 carrying a heated flow 25 to the jets 22. The water is returned to the spa by the jets 22 creating turbulence 27 in the spa. The pump motor 32 resides inside a spa enclosure 28 and often reaches high temperatures which may shorten motor life, or cause a thermal switch to trigger, turning off the spa 10.

Figure 2:
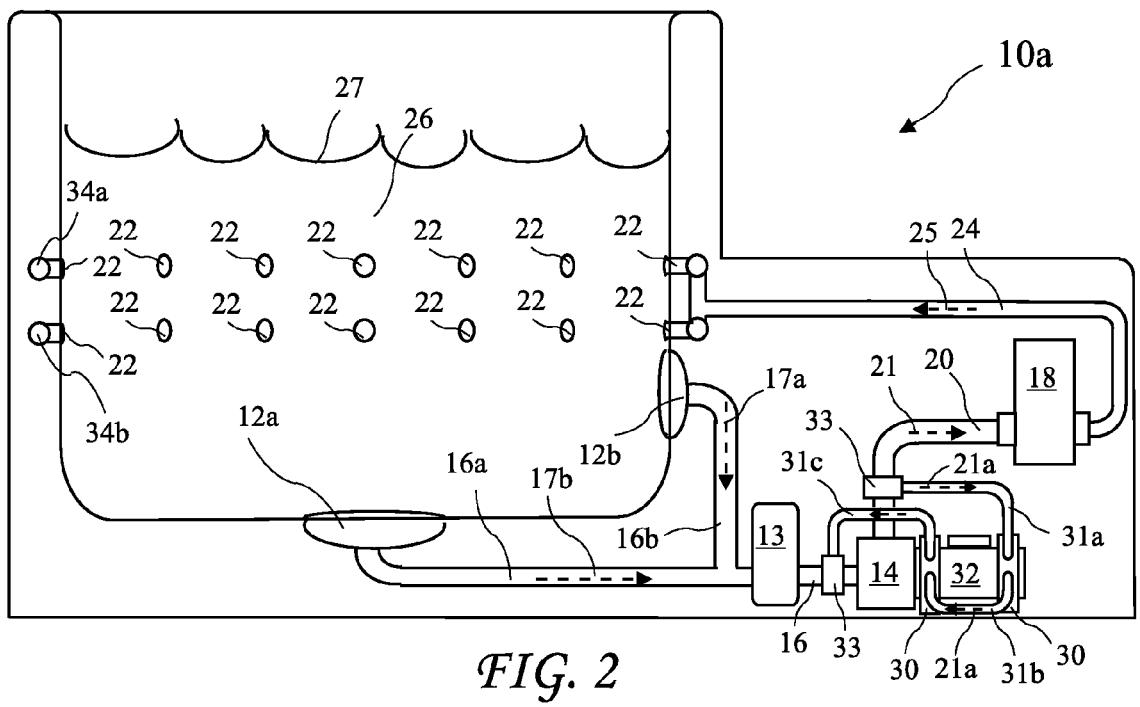
FIG. 2 is a spa with ring heat exchangers according to the present invention on the spa pump motor.

A spa 10a according to the present invention is shown in FIG. 2. The spa 10a is similar to the prior art spa 10, except that the spa 10a includes two ring heat exchangers 30 circling the motor 32 and a first bypass line 31a carrying a bypass flow portion 21a of the flow 21 from a high-pressure side of the spa pump 14 to the ring heat exchangers 30, a second bypass line 31b the bypass flow portion 21a between the ring heat exchangers 30, and a third bypass line 31c carrying the bypass flow portion 21a back to the flow 21 at a low-pressure side of the spa pump 14. The bypass line 31a is preferably connected to the line 20 after the pump 14 where pressure is high, and the bypass line 31c is preferably connected to the line 16 before the pump 14 where pressure is low, thereby creating a flow through the ring heat exchangers 30. The bypass lines 31a, 30a, and 30c preferably are connected to the lines 20 and 16 respectively by collars 33.

A perspective view of a generic spa pump motor with two ring heat exchangers 30 according to the present invention on the spa pump motor housing 36 is shown in FIG. 3, a side view of the ring heat exchanger 30 is shown in FIG. 4, and a cross-sectional view of the ring heat exchanger 30 showing a the flow of water through a path 58 in the ring heat exchanger 30 taken along line 5-5 of FIG. 4 is shown in FIG. 5. The spa pump motor includes at least one capacitor housing 38 preventing jackets disclosed in the prior art from being placed over a motor housing 36 of the spa pump motor 32. The ring heat exchangers 30 according to the present invention fit over ends of the motor housing 36 avoiding interference with the capacitor housing(s) 38. The ring heat exchangers 30 include a passage 60 receiving a portion of the flow 21 and another passage 60 releasing the portion of the flow 21. The bypass flow portion 21a of the flow 21 (see FIG. 2) enters the inlet 60a, circles the housing 36, and exits through the outlet 60b.

The bypass flow portion 21a of the flow 21 both cools the spa pump motor 32 and provides heat to the flow 21 to reduce heating requirements.

The bypass lines 31a, 30a, and 30c are preferably ¾ inch tubing and the bypass flow portion 21a of the flow 21 is preferably at least 15 gallons per minute, and more preferably at least 20 gallons per minute.

While the present invention is shown having two ring heat exchangers 30, in some embodiments either a single ring heat exchanger 30 may be adequate, or room may only permit a single ring heat exchanger 30. Such embodiments with more or less than two ring heat exchangers 30 are intended to come within the scope of the present invention.

Because the heat transfer rings 30 according to the present invention are significantly different from jackets disclosed in the prior art, tests were performed to determine whether or not, the heat transfer rings 30 provided useful cooling. A box was constructed having an interior volume approximately equal to the volume which the spa pump motors reside in. A Megaflow® model, MF23036, 230 V, 14 amp pump and motor assembly was tested for approximately 60 minutes. Pipes were connected to the pump and connected to a 300 gallon reservoir. After one hour of operation, the pump motor increased from 62 degrees Fahrenheit to 211 degrees Fahrenheit, an increase of 147 degrees Fahrenheit. After an additional seven minutes of operation, the motor thermal overload tripped and shut down the motor.

A second test was performed with heat transfer rings 30 according to the present invention residing over the motor housing. After one hour of operation, the motor temperature increased from 62 degrees Fahrenheit to 174 degrees Fahrenheit, an increase of 112 degrees Fahrenheit. The increase in motor temperature was reduced by 35 degrees Fahrenheit which significantly extends run time by eliminating tripping the thermal overload and significantly increases pump motor life. Additionally, transferring the heat to the water circulated in the spot reduces the amount of heating required, thus providing additional cost savings.

Figure 6B:
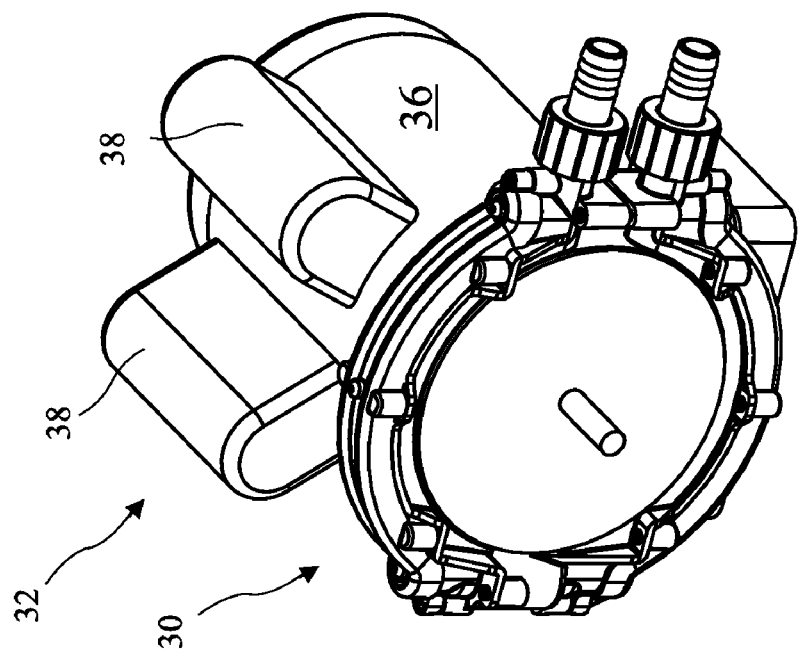
FIG. 6B is a detailed perspective view of the spa pump motor with one ring heat exchanger according to the present invention on the spa pump motor.
Figure 6A:
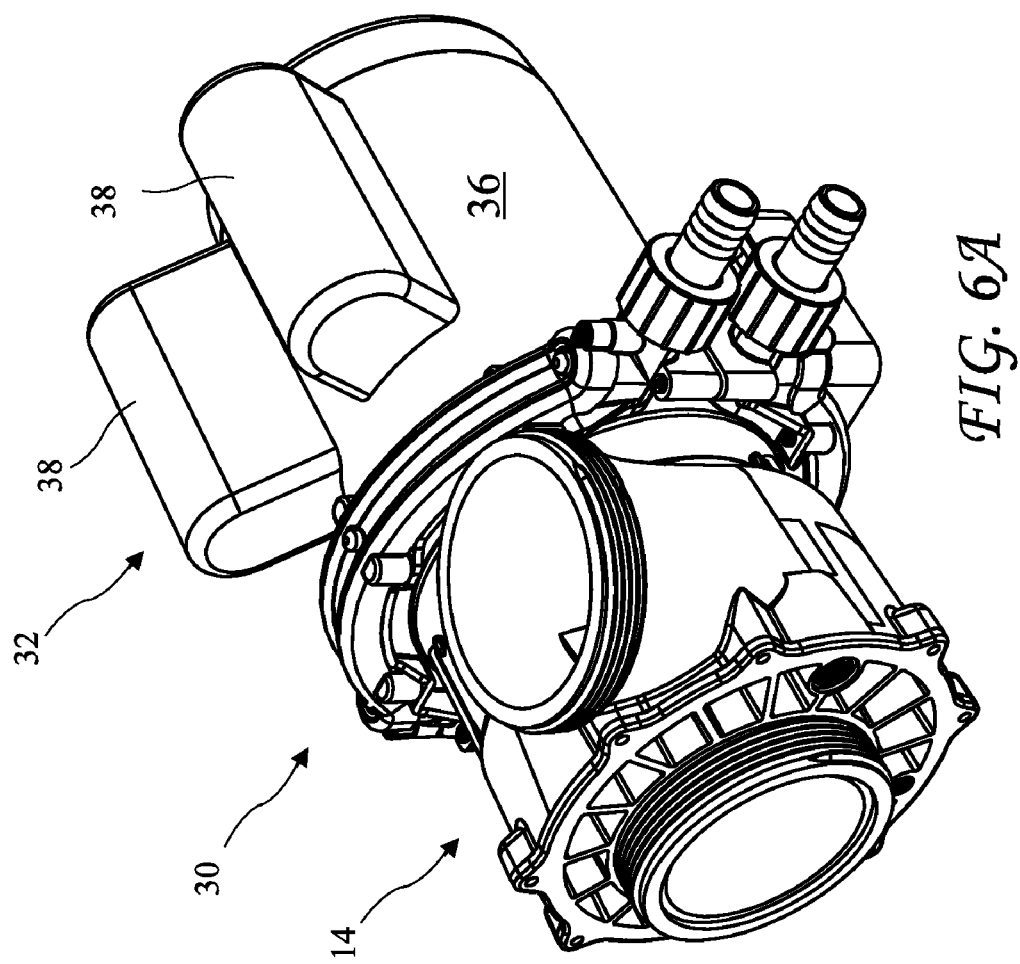
FIG. 6A is a detailed perspective view of a spa pump and motor with one ring heat exchanger according to the present invention on the spa pump motor.

A detailed perspective view of a spa pump 14 and motor 32 with one ring heat exchanger 30 according to the present invention on the spa pump motor 32 is shown in FIG. 6A and a detailed perspective view of the spa pump motor 32 only with one ring heat exchanger 30 on the spa pump motor32 is shown in FIG. 6B. The ring heat exchanger 30 is seen to reside directly against the motor housing 36 at an end of the motor housing 36 avoiding the capacitor housings 38.

A detailed side view of the spa pump 14 and motor 32 with one ring heat exchanger 30 on the spa pump motor 32 is shown in FIG. 7A, a detailed front view of the spa pump and motor with one ring heat exchanger on the spa pump motor 32 is shown in FIG. 7B, and a detailed top view of the spa pump 14 and motor 32 with one ring heat exchanger 30 on the spa pump motor 32 is shown in FIG. 7C. Two capacitor housings 38 reside on the motor housing 36 and the motor 32 is supported by a motor mount 39. The ring heat exchanger 30 resides at the pump 14 end of the motor 32 fitting between the motor mount 39 and the end of the housing 36.

A detailed perspective view of a preferred ring heat exchanger 30 according to the present invention is shown in FIG. 8, a side view of the ring heat exchanger 30 is shown in FIG. 9A, a front view of the ring heat exchanger 30 is shown in 9B, and a top view of the ring heat exchanger 30 is shown in FIG. 9C. The ring heat exchanger 30 includes a top half 42 and a bottom half 44. The top half 42 and the bottom half 44 are each approximately one half of a complete circle forming the ring heat exchanger 30, each half is not necessarily an exact half circle, but is near enough to a half circle to allow the ring heat exchanger 30 to be easily assembled over a cylindrical motor housing. The top half 42 and the bottom half 44 form two semi circles connected at ends by two pairs of screws 62. One of the top half 42 and the bottom half 44 receives the bypass flow portion 21a of the flow 21 into the heat transfer ring 30 and one of the top half 42 and the bottom half 44 releases the bypass flow portion 21a of the flow 21 from the heat transfer ring 30 (see FIG. 5). Barbed fittings 40 are shown attached to each of the top half 42 and the bottom half 44 for receiving and releasing the bypass flow portion 21a of the flow 21.

A cross-sectional view of the ring heat exchanger 30 according to the present invention taken along line 10-10 of FIG. 9A is shown in FIG. 10. The top half 42 and the bottom half 44 are seen to each include a base 50, and cap 46, and an O-Ring retainer 48 between the base 50 and the cap 46 and attached to the cap 46.

Figure 11B:
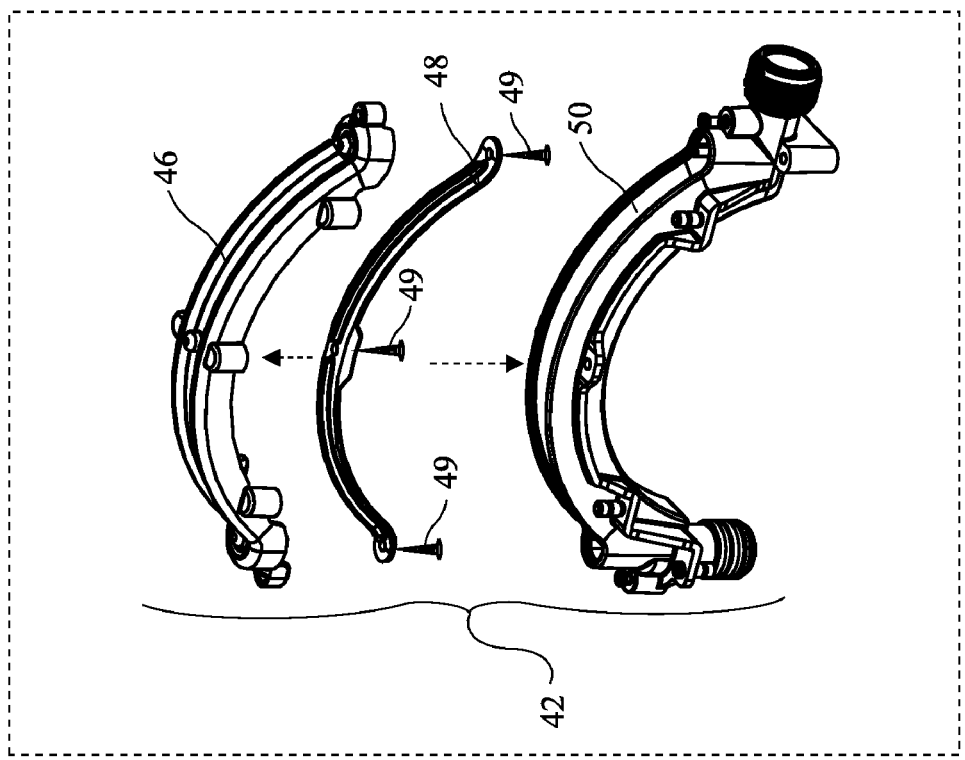
FIG. 11B is a perspective view of the top ring half separated into three main components.
Figure 11A:
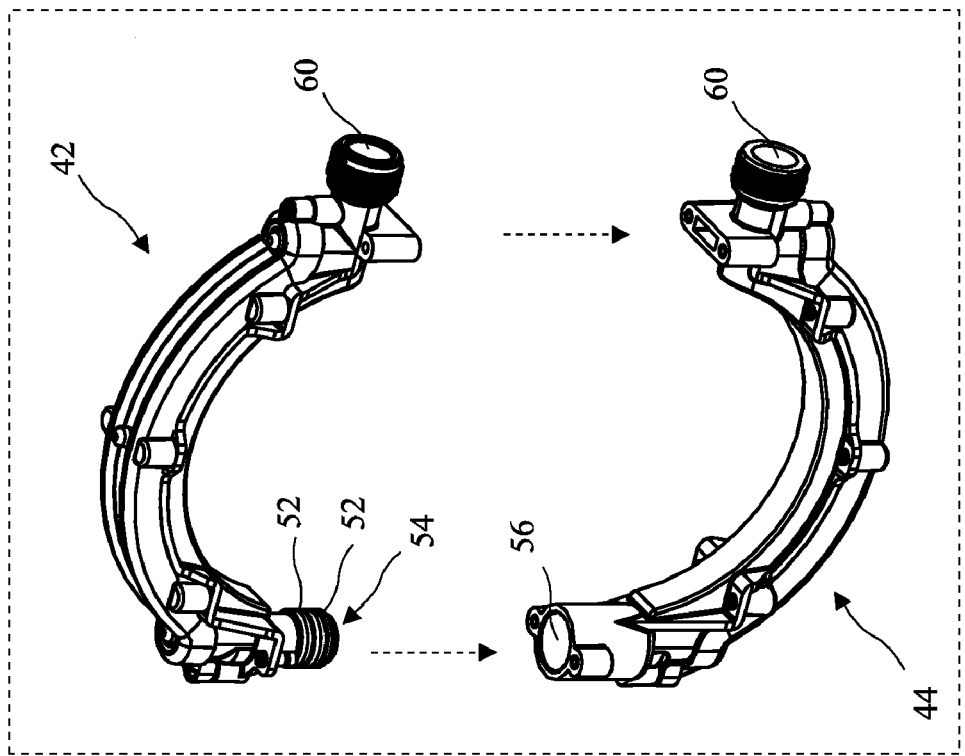
FIG. 11A is a perspective view of the ring heat exchanger according to the present invention separated into a top ring half and a bottom ring half.

A perspective view of the ring heat exchanger 30 separated into the top ring half 42 and the bottom ring half 44 is shown in FIG. 11A. The top ring half 42 includes a cylindrical female connector 54 for insertion into a cylindrical male connector 56 in the bottom ring half 44, the connectors 54 and 56 opposite the passages 60 on each ring half 42 and 44. O-rings 52 preferably reside in grooves in the connector 54 to provide a seal with the connector 56. The top ring half 42 is attached to the bottom ring half 44 by the two pairs of screws 62 shown in FIG. 9A.

A perspective view of the top ring half 42 separated into three main components, the base 50, the cap 46, and the O-Ring retainer 48 are shown in FIG. 11B. The O-Ring retainer 48 is attached to the cap 46 by three spaced apart screws 49. The screws 49 are preferably stainless steel screws or made from some other corrosion resistant material.

A detailed cross-sectional view 12 of the top ring half of FIG. 10 is shown in FIG. 12. The ring heat exchanger 30 has a width $W_R$ which is preferable less than approximately two inches to allow the ring heat exchangers 30 to reside against the motor housing 36 between the capacitor housings 38 and ends of the motor housing 36. The path 58 carries the portion of the bypass flow portion 21a of the flow 21 through the ring heat exchanger 30 (see FIG. 5). An O-Ring 47 resides between adjacent walls of the base 50 and the cap 46 to prevent water from leaking from the ring heat exchangers 30. The O-Ring 47 is installed with O-Ring lubricant. The O-Ring retainer 48 holds the O-Ring 47 in position. While such O-Ring retainer is generally not necessary between two flat surfaces, because the cooperating sealing surfaces of base 50 and the cap 46 are arced, the O-Ring retainer 48 is preferred.

A perspective view of the O-Ring retainer 48 element according to the present invention is shown in FIG. 13, a side view of the O-Ring retainer 48 is shown in FIG. 14a, an end view of the O-Ring retainer 48 is shown in FIG. 14B, and a top view of the O-Ring retainer 48 is shown in FIG. 14C. The O-Ring retainer has a "T" shaped cross-section (see FIG. 12) for accepting the O-Ring 47 (see FIG. 12) and is attached to the cap 46.

A top view of the O-Ring 47 is shown in FIG. 15.

While the invention herein disclosed has been described by means of specific embodiments and applications thereof, numerous modifications and variations could be made thereto by those skilled in the art without departing from the scope of the invention set forth in the claims.

I claim:

1. A spa having an electric spa pump motor having a ring heat exchanger, the spa comprising:
   a spa tub having a spa tub wall;
   water residing in the spa tub;
   at least one drain for receiving a flow of the water from the spa tub;
   a spa pump;
   a first pipe carrying the flow of water from the drain to the spa pump;
   second pipes carrying the flow of water from the spa pump to jets in the spa tub wall;
   a spa pump motor having a motor housing for turning the spa pump;
   at least one ring heat exchanger comprising a top half assembled to a bottom half, each half being approximately half of a circle, the ring heat exchanger residing in contact with the motor housing at an end of the motor housing and having a ring width $W_R$ of less than two inches;
   a first water line carrying at least a portion of the flow of water to the at least one ring heat exchanger; and
   a second line carrying at least a portion of the flow of water from the at least one ring heat exchanger, wherein
   a ring width $W_R$ is narrow enough to allow the ring heat exchanger to reside on the motor housing between a motor mount used to mount the motor and the end of the motor housing.

2. The spa of claim 1, wherein the ring heat exchanger completes a circle around the motor housing.

3. The spa of claim 2, wherein the top half is attached to the bottom half using screws.

4. The spa of claim 1, wherein:
   each ring heat exchanger half includes a passage for water to enter and to exit the ring heat exchanger; and
   each ring heat exchanger half includes a connector for allowing a flow through the ring heat exchanger to enter a first half, pass from the first half to the second half, and exit the ring heat exchanger.

5. The spa of claim 1, wherein each ring heat exchanger half comprises an approximately semi-circular cap attached to an approximately semi-circular base.

6. The spa of claim 1, wherein an O-Ring retainer resides between the base and cap and retains an O-Ring sealing adjacent surfaces of the base and cap.

7. A spa having an electric spa pump motor having a ring heat exchanger, the spa comprising:
   a spa tub having a spa tub wall;
   water residing in the spa tub;
   at least one drain for receiving a flow of the water from the spa tub;
   a spa pump;
   a first pipe carrying the flow of water from the drain to the spa pump;
   second pipes carrying the flow of water from the spa pump to jets in the spa tub wall;
   a spa pump motor having a motor housing for turning the spa pump;
   at least one ring heat exchanger comprising a top half assembled to a bottom half, each half being approximately half of a circle, the ring heat exchanger residing in contact with the motor housing at an end of the motor housing and having a ring width $W_R$ of less than two inches;
   a first water line carrying at least a portion of the flow of water to the at least one ring heat exchanger; and
   a second line carrying at least a portion of the flow of water from the at least one ring heat exchanger, wherein a ring width $W_R$ is narrow enough to allow the ring heat exchanger to reside on the motor housing between a capacitor housing on the motor housing and the end of the motor housing.

8. A spa having an electric spa pump motor having a ring heat exchanger, the spa comprising:

a spa tub having a spa tub wall;

water residing in the spa tub;

at least one drain for receiving a flow of the water from the spa tub;

a spa pump;

a first pipe carrying the flow of water from the drain to the spa pump;

second pipes carrying the flow of water from the spa pump to jets in the spa tub wall;

a spa pump motor having a motor housing for turning the spa pump;

at least one ring heat exchanger comprising a top half assembled to a bottom half, each half being approximately half of a circle, the ring heat exchanger residing in contact with the motor housing at an end of the motor housing;

one of the top half and the bottom half includes a passage for allowing a by-pass portion of the flow of water received through a first by-pass line connected to the high-pressure side of the spa pump to enter the ring heat exchanger; and the other one of the top half and the bottom half includes a passage for allowing the by-pass portion of the flow of water to exit the ring heat exchanger through a second by-pass line connected to the low-pressure side of the spa pump.

9. A spa having an electric spa pump motor having a ring heat exchanger, the spa comprising:

a spa tub having a spa tub wall;

water residing in the spa tub;

at least one drain for receiving a flow of the water from the spa tub;

a spa pump;

a first pipe carrying the flow of water from the drain to the spa pump;

second pipes carrying the flow of water from the spa pump to jets in the spa tub wall;

a spa pump motor having a motor housing for turning the spa pump;

at least one ring heat exchanger comprising a top half assembled to a bottom half, each half being approximately half of a circle, the ring heat exchanger residing in contact with the motor housing at an end of the motor housing and having a ring width $W_R$ of less than two inches;

a first water line carrying at least a portion of the flow of water to the at least one ring heat exchanger; and a second line carrying at least a portion of the flow of water from the at least one ring heat exchanger, wherein:

each ring heat exchanger half includes a passage for water to enter and to exit the ring heat exchanger; and each ring heat exchanger half includes a connector for allowing a flow through the ring heat exchanger to enter a first half, pass from the first half to the second half, and exit the ring heat exchanger.

10. A spa having an electric spa pump motor having a ring heat exchanger, the spa comprising:

a spa tub having a spa tub wall;

water residing in the spa tub;

at least one drain for receiving a flow of the water from the spa tub;

a spa pump;

a first pipe carrying the flow of water from the drain to the spa pump;

second pipes carrying the flow of water from the spa pump to jets in the spa tub wall;

a spa pump motor having a motor housing for turning the spa pump;

at least one ring heat exchanger comprising a top half assembled to a bottom half, each half being approximately half of a circle, the ring heat exchanger residing in contact with the motor housing at an end of the motor housing and having a ring width $W_R$ of less than two inches;

a first water line carrying at least a portion of the flow of water to the at least one ring heat exchanger; and a second line carrying at least a portion of the flow of water from the at least one ring heat exchanger, wherein:

wherein each ring heat exchanger half comprises an approximately semi-circular cap attached to an approximately semi-circular base; and an O-Ring retainer resides between the base and cap and retains an O-Ring sealing adjacent surfaces of the base and cap.

* * * * *